March 7, 1939. E. GULDEN 2,149,996
LIVE BAIT CARRIER
Filed Dec. 9, 1937
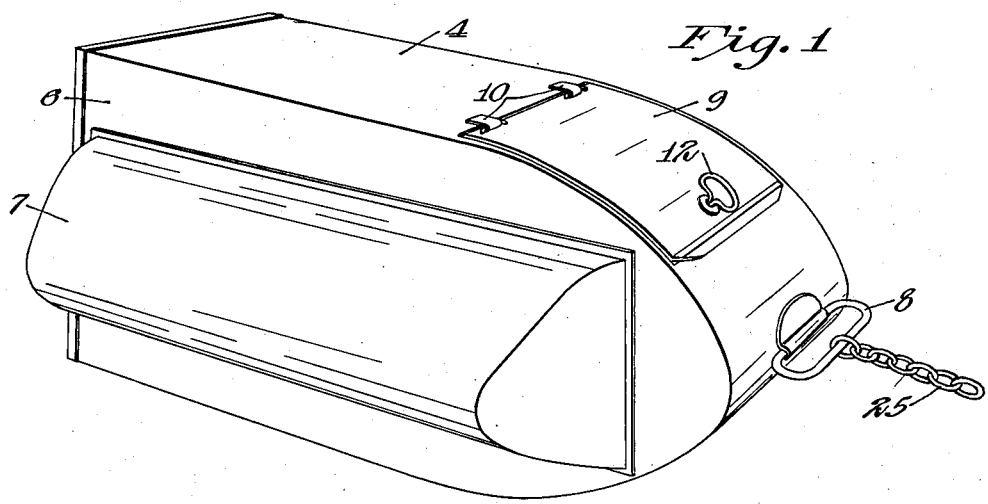
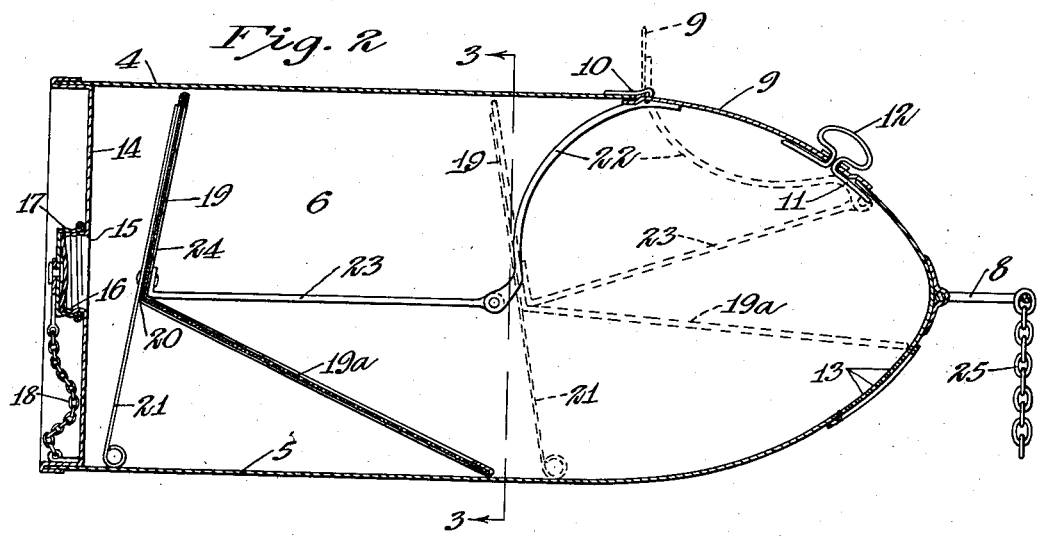
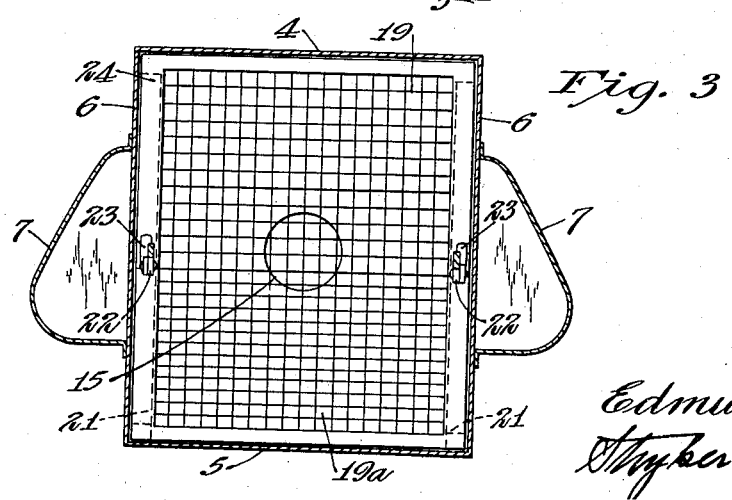
Inventor
Edmund Gulden
Stryker & Stryker
Attorneys Patented Mar. 7, 1939

2,149,996

UNITED STATES PATENT OFFICE 2,149,996

LIVE BAIT CARRIER

Edmund Gulden, St. Paul, Minn., assignor of three-fourths to Herbert C. Gulden, Rhinold Gulden, and George W. Granstrom, all of St. Paul, Minn.

Application December 9, 1937, Serial No. 178,914

8 Claims. (Cl. 43—55)

This invention relates to a carrier particularly adapted to contain live bait, such as the minnows used by fishermen.

It is an object of my invention to provide a novel device of this kind adapted to be at least partially submerged in a body of water and having means for keeping minnows supplied with fresh water at all times and for facilitating the selection and removal of the minnows as they are needed for use.

A particular object is to provide a bait carrier of this class having novel means for gathering all of the bait in such position within the carrier as to facilitate its selection and removal from time to time as required in use, the gathering mechanism being so constructed as to guard against injury to the live bait.

The invention will be best understood by reference to the accompanying drawing in which:

Figure 1 is a perspective view of my improved carrier;

Fig. 2 is a central, vertical, longitudinal section through the device, and

Fig. 3 is a cross section taken on the line 3—3 of Fig. 2.

The device has an elongated bait chamber which extends horizontally when in its normal position in the water and is provided with a top wall 4, a bottom wall 5 and side walls 6 connected together as shown in Fig. 3. A horizontally elongated float chamber 7 is secured to the outer surface of each of the walls 6, these chambers being sealed against the entry of water to give the desired buoyancy and stability to the carrier when in the water. The top wall 4 and bottom wall 5 converge toward each other to form a front end on the carrier and a handle 8 is secured to this end, as shown in Figs. 1 and 2. The inclined part of the top wall 4 is formed with an opening of substantial size and a door 9 for closing this opening has hinges 10 supporting it at its rear edge. A latch 11 near the front edge of the door may be operated by a handle 12 for movement to and from engagement with the fixed wall of the carrier. Thus, the door 9 is adapted to be opened upwardly and outwardly to allow access to the interior of the carrier.

Formed in the bottom wall 5, near the front end of the carrier, is a multiplicity of small openings 13 which admit water to tthe carrier when submerged and air when removed from the water. An end wall 14 is secured to the walls 4, 5 and 6 and has a central opening 15 communicating with a tubular neck 16 which is threaded to receive a closure cap 17 (Fig. 2). To guard against loss of the cap 17 it is preferably connected to one of the walls of the carrier by a small chain 18. This cap is used to close the opening 15 when the device is removed from the water, as when a quantity of water containing the bait is to be carried as in an ordinary bait pail.

A screen 19 extends from top to bottom and from side to side of the interior of the carrier and is slidably mounted for movement longitudinally in the bait chamber. The mesh of this screen is of such size as to prevent the passage of the bait or minnows therethrough and to allow the free passage of water. As shown in Fig. 2, the screen has a lower portion 19a extending obliquely to the front and down from a horizontal bend 20 which is preferably formed in the screen near the horizontal center plane through the carrier when in its normal position in the water. A pair of legs 21 slidably support the rear extremity of the screen on the bottom wall 5 and the front extremity of the portion 19a of the screen also slidably engages the bottom wall 5.

The screen 19 is operatively connected to the door 9 by pairs of arms 22 and 23. One end of each of the arms 22 is rigidly secured to the door 9 near its hinged edge and the other end is pivotally connected to one of the arms 23. The latter arms have their rear ends secured to a marginal reinforcement or frame 24 carrying the screen 19.

In use the device may be suspended from the handle 8 and carried about when out of the water. When in this suspended position the necessary quantity of water is carried with the bait, the cap 17 being secured on the neck 16 to close the opening 15. With the door 9 closed, air is supplied to the interior of the carrier through the openings 13. The fisherman, upon reaching the body of water to be fished, places the bait carrier in the water in the horizontal position shown in the drawing and removes the cap 17 to allow free flow of fresh supplies of water into the openings 13 and out through the opening 15. The carrier may be moored or towed from a boat by means of a tow line, such as the chain 25, a portion of which is shown in the drawing. When towed in this manner the movement of the boat causes fresh water to circulate through the carrier from the front openings 13 and out through the opening 15. The bait chamber is buoyed up by the float chambers 7 and is retained thereby in such position as to maintain the door 9 within convenient reach at the top.

All of the bait within the carrier is made instantly accessible by merely opening the door 9.

As the door is opened the arms 22 and 23 move the screen 19 from the full line to the dotted line position shown in Fig. 2. During this movement the front edge of the portion 19a of the screen slides up the inclined bottom wall 5 while the entire screen is drawn to the front end of the bait chamber near the door opening. The screen is thus caused to gather the bait where it is all readily visible and accessible and the selection and withdrawal of the selected bait is made unusually easy. Upon the closing of the door 9 the screen 19 is retracted to its position near the end wall 14, allowing the minnows or other bait to occupy substantially the entire chamber.

It will now be evident that the carrier, when in its normal position in the water, is horizontally elongated and is drawn through the water longitudinally so that it offers a minimum resistance to movement of the fishermen's boat. This facilitates the carrying of an unusually large and ample supply of bait. Provision of the openings for ingress and egress of fresh water at opposite ends of the longitudinally moving bait chamber insures a continuous supply and proper circulation of fresh water in the bait chamber. An advantageous feature of my improved screen and operating mechanism therefor resides in the arrangement whereby injury to the live bait is carefully guarded against. Injury to the bait is avoided by causing the arms 23 to move substantially longitudinally and closely adjacent to the side walls 6, by actuating the arms 22 along the side walls and upwardly toward the door opening, and by so fitting the screen frame 24 against the several walls as to prevent the catching and crushing of the bait between the moving frame and fixed walls.

Having described my invention, what I claim as new and desire to protect by Letters Patent is:

1. A live bait carrier comprising, a horizontally elongated bait chamber, float compartments extending along opposite sides of said chamber, a foraminous gathering member extending from top to bottom and from side to side of said chamber and movable longitudinally therein, said chamber having an opening near one end, an upwardly and outwardly opening closure for said opening and means operatively connecting said gathering member to said closure for actuating said member longitudinally within said chamber to and from said opening when the closure is moved to and from open position.

2. In a live bait carrier, a horizontally elongated bait chamber, a screen extending substantially from top to bottom and from side to side of said chamber and movable longitudinally therein, an upwardly and outwardly opening door mounted at the top near one end of said chamber, said chamber having an opening adapted to be closed by said door to allow access to the interior of said chamber and means operatively connecting said screen to said door for actuting said screen longitudinally within said chamber to and from said opening, said screen being arranged to gather all of the bait in said chamber to a position near the opening when the door is opened.

3. In a live bait carrier, a horizontally elongated bait chamber, a screen extending substantially from top to bottom and from side to side of said chamber and movable longitudinally therein, an upwardly and outwardly opening door mounted near one end of said chamber to allow access to the interior thereof, said chamber having an opening arranged to be closed by said door, a pair of arms projecting from said door into said chamber and a second pair of arms pivotally joined to said first mentioned arms and fastened to said screen for actuating said screen longitudinally within said chamber to and from said opening when said door is moved to and from open position.

4. In a live bait carrier, a horizontally elongated bait chamber, a foraminous bait gathering member extending from top to bottom and from side to side of said chamber, said member being movable longitudinally of the chamber, said chamber having an opening therein near one end at the top thereof to allow access to the interior, a closure for said opening, means for actuating said gathering member longitudinally within said chamber to and from said opening, said gathering member having a forwardly projecting lower portion slidably engaging the bottom of said chamber and means for guiding the front end of said gathering member to elevated position beneath said opening, said member being arranged to gather all of the bait in the chamber to a position near said opening.

5. In a live bait carrier, a horizontally elongated bait chamber, a foraminous bait gathering member extending from top to bottom and from side to side of said chamber, said member being movable longitudinally of the chamber, said chamber having an opening near one end at the top thereof to allow access to the interior, a closure for said opening and means for actuating said gathering member longitudinally within said chamber to and from said opening, said gathering member having a forwardly projecting lower portion slidably engaging the bottom of said chamber and formed to extend beneath said opening when the gathering member is actuated to a position near said opening.

6. A live bait carrier comprising, a bait chamber having a pair of long and relatively narrow side walls normally disposed in horizontally spaced, vertical position and with their greatest dimension horizontal, top and bottom walls having converging front portions, said top wall being formed with an opening to allow access to the interior of said chamber located near the front end of said chamber, a closure for said opening, a foraminous bait-gathering member movable longitudinally of said chamber and extending from top to bottom and from side to side thereof and means for actuating said member longitudinally of said chamber to and from said opening, said member having a lower portion slidable along said bottom and projecting obliquely forward and down beneath said opening when the gathering member is actuated to a point near said opening.

7. A live bait carrier comprising, a bait chamber having a pair of plane, long and relatively narrow side walls normally disposed in horizontally spaced, vertical positions and with their greatest dimension horizontal, top and bottom walls having converging front portions, said top wall being formed with an opening to allow access to the interior of said chamber, near the front end thereof, a closure for said opening, a foraminous bait-gathering member movable longitudinally of said chamber and extending from top to bottom and from side to side thereof and means for actuating said member longitudinally of said chamber to and from said opening, said member having a lower portion slidable along said bottom and formed to project beneath said opening when the gathering member is actuated to a point near said opening and inlet and outlet passages for water severally communicating with the ends, respectively, of said chamber.

8. A live bait carrier comprising, a bait chamber having a pair of plane, long and relatively narrow side walls normally disposed in horizontally spaced, vertical positions and with their greatest dimension horizontal, top and bottom walls having converging front portions, said top wall being formed with an opening to allow access to the interior of said chamber, located near the front of said chamber, a door for closing said opening, a foraminous bait-gathering member movable longitudinally of said chamber and extending from top to bottom and from side to side thereof, means operatively connecting said door to said gathering member for actuating said member longitudinally of said chamber to and from said opening, said member having a lower portion slidable along said bottom wall and arranged to be guided thereby to an elevated position beneath said opening when said door is opened, a rear end wall formed with a water outlet, a closure for said outlet and an inlet passage for water communicating with the front end of said chamber.

EDMUND GULDEN.